Aug. 23, 1938.                R. BISCHOFF                2,128,071
                                VALVE
                        Filed July 25, 1936         4 Sheets-Sheet 1

INVENTORS
EUGENE C. BRISBANE AND
ROBERT BISCHOFF
BY
Malcolm F. Gannett
ATTORNEY

Aug. 23, 1938.    R. BISCHOFF    2,128,071
VALVE
Filed July 25, 1936    4 Sheets-Sheet 3

INVENTORS
EUGENE C. BRISBANE AND
ROBERT BISCHOFF
BY Malcolm T. Gannett
ATTORNEY

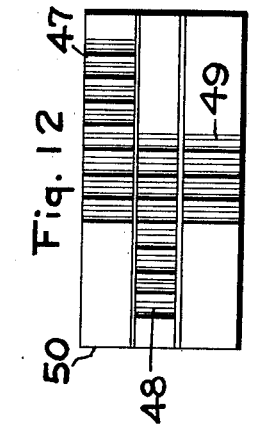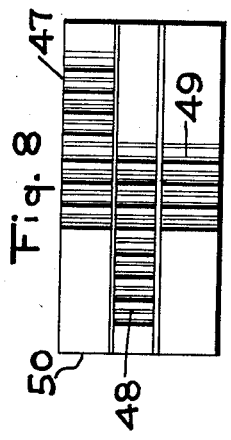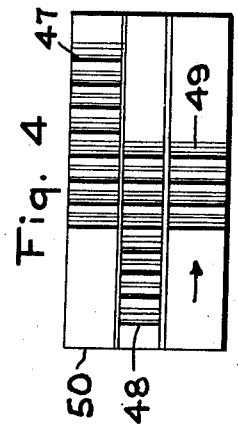

Patented Aug. 23, 1938

2,128,071

UNITED STATES PATENT OFFICE 2,128,071

VALVE

Robert Bischoff, York, Pa., assignor to S. Morgan Smith Company, York, Pa., a corporation of Pennsylvania Application July 25, 1936, Serial No. 92,553

1 Claim. (Cl. 74—1)

This invention relates to valves, and more particularly to the mechanism for opening and closing the valve.

An object of the invention is to provide an improved valve of the type having a tapered plug in which mechanism is provided for first raising the valve plug from its seat, then rotating the plug to open or to closed position, and thirdly, reseating the plug in either open or closed position.

Another object of the invention is to provide an improved valve structure which includes a rotatable plug having a shaft with a sleeve loosely mounted thereon, and a plurality of gear sectors operatively associated with the sleeve and shaft so that operation of the sectors effects operation of the sleeve and valve in such a way that the valve plug is operated in the desired manner.

Another object of the invention is to provide an improved valve structure of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

Figure 1:
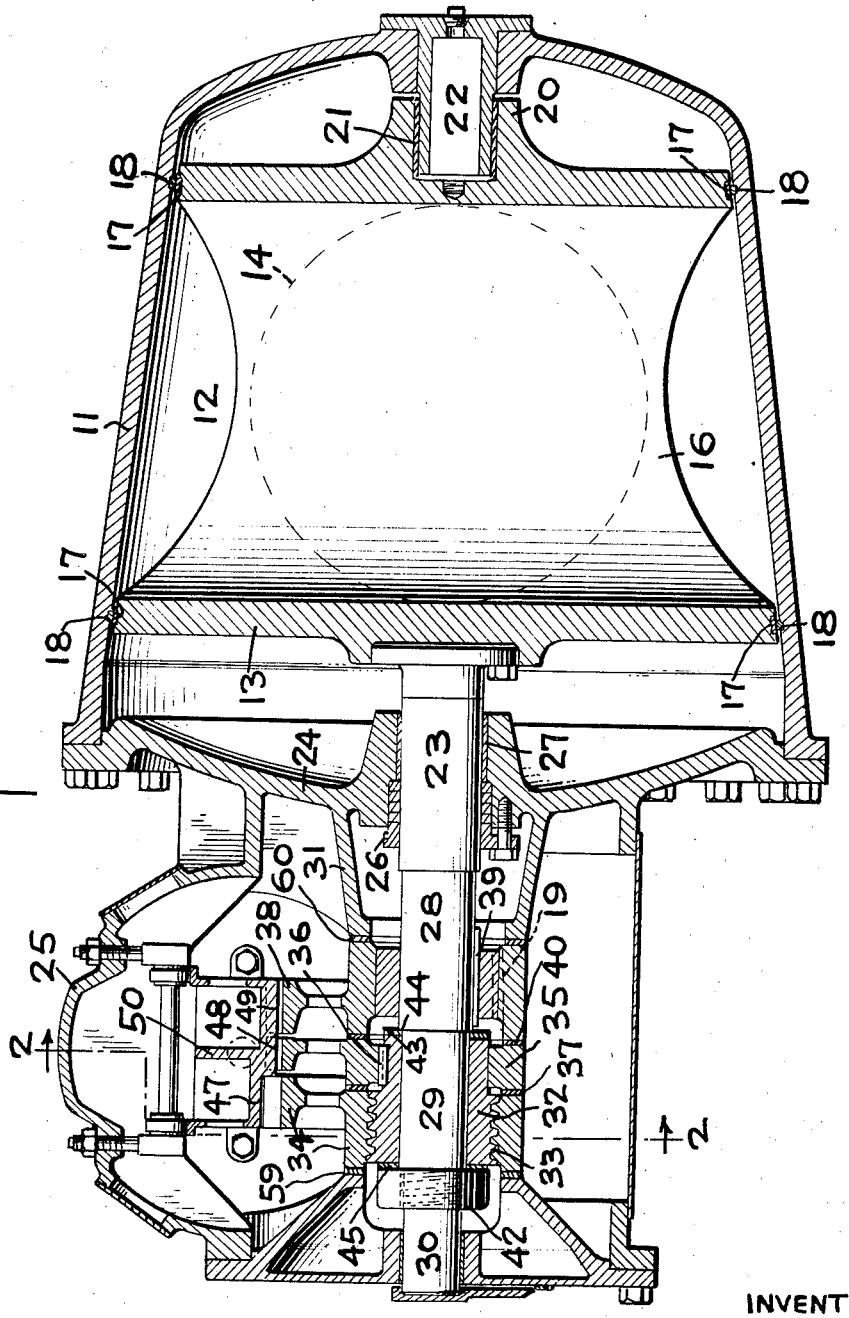
Figure 1 is a section through a valve embodying the present invention, the plug being shown in closed position.

Figs. 4-7 inclusive are diagrammatic views of the gear sectors and their associated racks in valve closed and plug seated position;

Figs. 8-11 inclusive are diagrammatic views of the gear sectors and their associated racks in valve plug rotating position; and Figs. 12-15 inclusive are diagrammatic views of the gear sectors and their associated racks in valve open and plug seated position.

The drawings illustrate a straight-way valve, but the improvements are equally applicable to three or four way, elbow and angle valves.

The present invention relates to tapered plug valves, in which, during the operation of the valve, the conical plug is first unwedged from its seat by moving the plug in a straight line axially. After the plug is unseated, it is turned the desired angle to either an open or closed position. At the completion of the rotary movement, the plug is then moved axially and wedged or reseated. The plug operating mechanism includes three gears or sectors having teeth which are operated by three racks so as to effect the three movements of the plug above referred to, i. e., first, the unwedging of the plug, second, the turning of the plug, and third, the reseating of the plug after it has been turned. The manner in which the valve operating mechanism is constructed and operated will now be described.

Referring to the drawings, the improved valve comprises a main body or casing 11 having a cavity 12 formed therein for a tapered plug 13, the cavity 12 being intersected by a longitudinal waterway or opening 14 which constitutes a passage through the valve. The plug 13 has a passage 16 formed therein of substantially the same diameter as the valve passage 14, so that when the plug 13 is in fully open position, a uniform bore will extend through the valve from end to end.

The valve plug 13 may be equipped with seat rings 17 which are adapted to engage seat rings 18 mounted in the body 11 so as to provide a tight joint between the plug and the valve body when the plug is in either its open or closed position.

The tapered plug 13 is supported for both axial and rotary movement in the valve body 11.

At its inner or smaller end, the plug 13 is formed with an extension which constitutes a trunnion 20 having an opening 21 formed therein for the reception of a stem or spindle 22 projecting inwardly from the smaller end of the valve body 11.

At its outer or larger end, the plug 13 has secured thereto, one end of a shaft or stem 23 which extends through a web 24 of a housing 25 attached to the valve body 11, said web constituting a cover plate for the larger end of the valve body, and said housing 25 constituting a closure for the valve operating mechanism.

A packing gland 26 fastened to the outer side of the web 24, prevents leakage of fluid around the shaft 23.

A bushing 27 is mounted in the web 24 and surrounds the plug shaft 23. This bushing constitutes the main bearing for the shaft 23.

In the present instance, the valve shaft 23 is shown as being formed with a plurality of sections which successively decrease in diameter from the plug 13 outwardly. The inner or larger section of the valve shaft is indicated by reference numeral 23. The other sections 28, 29 and 30 are constructed of less diameters than the portion 23 for a purpose to be hereinafter more fully described.

Mounted on the portion 29 of the valve shaft is a sleeve 32 having a portion of its exterior formed with screw threads 33. The sleeve 32 is free to turn on the valve shaft.

Mounted on the threaded portion 33 of sleeve 32 is a sector 34, the purpose of which is to effect seating and unseating of the plug 13 during operation of the device as will be hereinafter described.

Figure 3:
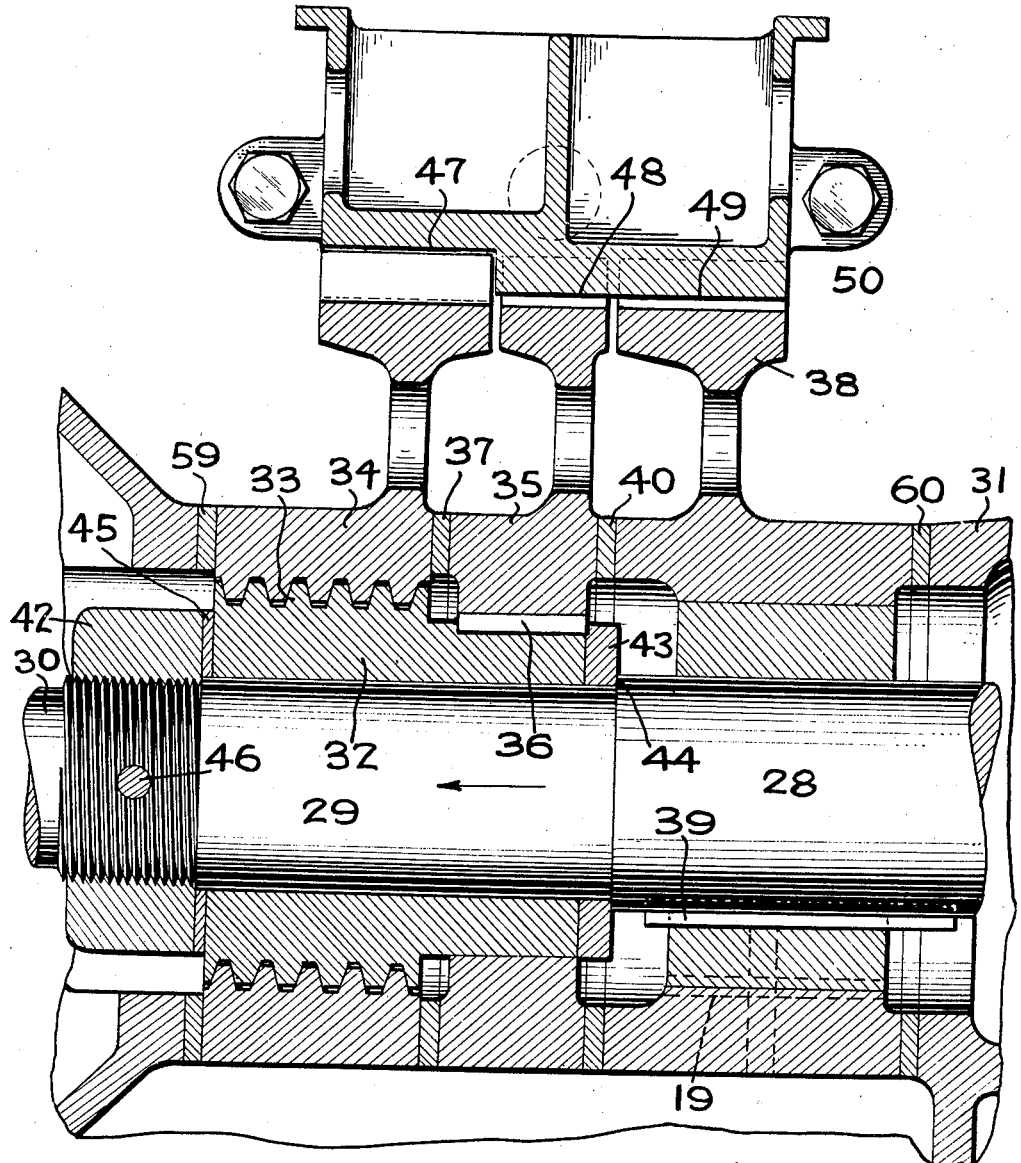
Fig. 3 is an enlarged section of a portion of the valve plug shaft and the gear sectors mounted thereon.

Also mounted on sleeve 32 is a second sector 35, which is connected to the sleeve 32 by means of a sliding key 36 so that when the sector 35 is rotated or operated, the sleeve 32 will also be turned (see Fig. 3).

Interposed between sectors 34 and 35 is a washer 37, which serves as means for retaining the sectors 34 and 35 properly positioned on the sleeve 32.

Mounted on the section 28 of the valve shaft is a third sector 38 which is connected to said shaft by a key 39. The purpose of sector 38 is to turn the valve plug 13 from closed to open position and vice versa, and key 39 is a sliding key, by which axial movement of the valve shaft 23 is permitted during the operation of the device without imparting a similar movement to sector 38.

In the drawings the hub of sector 38 is shown as being constructed of two parts. This is done so that the parts can be more easily and cheaply made. However, when the device is being assembled the inner part of the hub of sector 38 is connected to the outer portion of the hub by a key 19 so that both parts are as one.

The hub of sector 38 is maintained spaced from the hub of sector 35 by a washer 40.

Washers 59 and 60 are, respectively, interposed between the outer end of the hub of sector 34 and the adjacent wall of housing 25, and the inner wall of the hub of sector 38 and the adjacent end of hollow boss 31 projecting outwardly from the web 24.

The outer portion 30 of the valve shaft is formed with screw threads 41 for the reception of a nut 42.

A thrust washer 43 is interposed between the inner face of sleeve 32 and the shoulder 44 between sections 28 and 29 of the valve shaft, and a second thrust washer 45 is interposed between the outer face of sleeve 32 and the inner face of nut 42.

Nut 42 is screwed inwardly an amount to retain sleeve 32 in position on the portion 29 of the valve shaft, but nut 42 is not screwed in far enough to bear tightly against said sleeve, since the sleeve 32 should be free to turn on the shaft and should also be free to float up and down the shaft a slight distance, say .005 to .015 of an inch.

When the sleeve 32 has been properly positioned on the valve shaft, nut 42 is locked in place by means of a set screw 46.

Operatively associated with the three sectors 34, 35 and 38, are three racks 47, 48 and 49, respectively. If so desired these racks may be formed separately. In the instant case the racks are shown formed integrally on a bar 50 slidably mounted within the housing 25, and the teeth of said racks are formed in a staggered relation to each other, as shown clearly in Figs. 4, 8 and 12, for a purpose to be hereinafter described.

Figure 2:
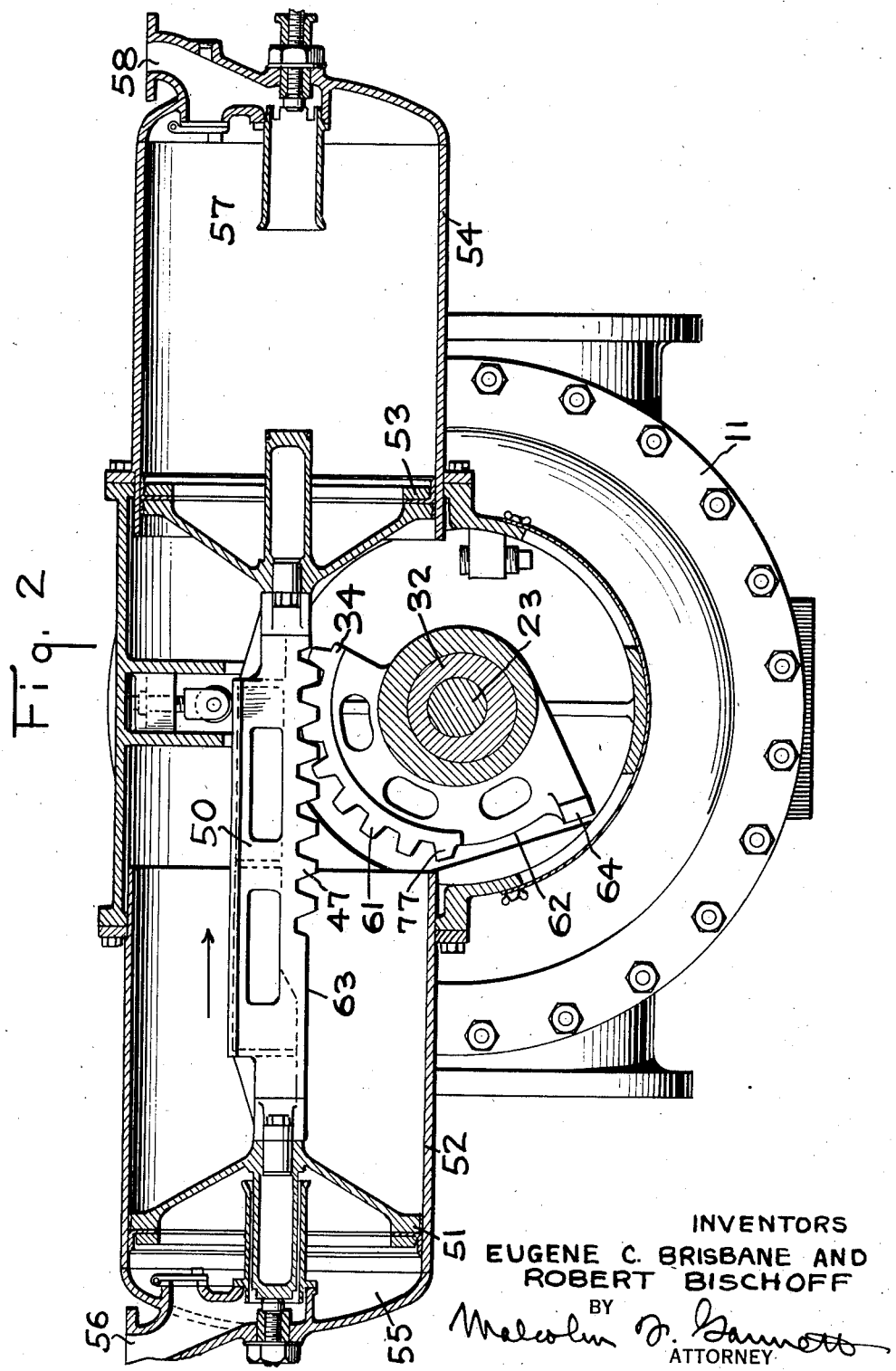
Fig. 2 is a transverse section taken along the line 2—2 of Fig. 1.

Any suitable means may be employed for operating the racks. In the present instance, one end of bar 50 is connected to a piston 51 in a cylinder 52, and the other end of bar 50 is connected to a piston 53 in a cylinder 54. The pistons and their respective cylinders are opposed as shown in Fig. 2.

Chamber 55 on the outer end of cylinder 52 has a port 56, and chamber 57 on the outer end of cylinder 54 has a port 58. The ports 56 and 58 may be connected to suitable mechanism (not shown) controlling fluid under pressure for alternately operating pistons 51 and 53, so that the racks will be reciprocated in the housing 25, and thereby operate the sectors 34, 35 and 38.

Each sector is formed with a series of teeth which are adapted to move into meshing relationship with the teeth of its associated rack during operation of the device in the manner to be hereinafter described, so that the sector will be rotated by its rack.

Means are also provided by which each sector will be locked in a predetermined position after such sector has been rotated, so that continued movement of the rack will not continue to operate the sector.

The disposition of the toothed and non-toothed portions of the sectors is such that when the racks 47, 48 and 49 are in one position, the teeth of certain sectors will be in meshing relationship with the teeth of their associated racks and other sectors will not have their teeth in mesh with teeth of their associated racks, and when the racks are moved from such position to another position, the teeth of other sectors will be moved into meshing relationship with the teeth of their associated racks so that said latter sectors will be actuated.

Referring now to Figs. 5, 9 and 13, sector 34 is formed with a series of teeth 61 for meshing with the teeth of the rack 47. At one end of the series of teeth 61, there is a cut-off or flattened tooth 77. Beyond the tooth 77, the edge of the sector 34 is formed with a plain arcuate portion 62 having a smaller radius than the radius of the toothed portion of the sector, so that the portion 62 will not contact with the adjacent surface of the rack 47 during the operation of the device. Beyond the portion 62, the sector 34 is formed with a lug 64 which is adapted to engage a plain face 63 of the rack 47. When tooth 77 and lug 64 engage the plain face 63 of the rack 47, a stop is provided for preventing further rotation of the sector 34 (see Fig. 13).

When the valve is closed and the plug 13 seated, the teeth 61 of sector 34 are in mesh with the teeth of rack 47. The disposition of sector 34 with respect to the rack 47 in this position of the device is such that only a few of the sector teeth 61 are in mesh with the teeth of the rack, so that when the rack is moved in the direction of the arrow, Fig. 5, other teeth of the sector 34 will be made to mesh with the teeth of the rack 47, and consequently the sector 34 will be turned a predetermined amount by the rack.

After the sector 34 has thus been rotated a predetermined amount, through the intermeshing of the rack teeth 47 with the sector teeth 61, the teeth will unmesh and the flattened or deformed tooth 77 and lug 64 of sector 34 will be presented to the plain face or untoothed portion 63 of the rack 47, as shown in Fig. 13, and thus further rotation of the sector 34 will be prevented.

As shown in Figs. 6, 10 and 14, the sector 35 is formed with a series of teeth 68 adapted to mesh with the teeth of the rack 48. At one end of the series of teeth 68 there is a cut-off or flattened tooth 78. Beyond the tooth 78, the edge of the sector 35 is formed with a plain arcuate portion 66 having a smaller radius than the radius of the toothed portion of the sector 35, so that the portion 66 will not contact with the adjacent surface of the rack 48 during the operation of the device. Beyond the portion 66 the sector 35 is formed with a lug 65. Tooth 78 and lug 65 are adapted to engage the plain surface 67 of the rack 48, as shown in Fig. 6, and when so positioned a stop is provided for preventing rotation of the sector 35.

Insofar as details of construction are concerned, sector 35 is substantially similarly formed at its periphery as is sector 34. However, as will be noted by comparing Fig. 5 with Fig. 6, sector 35 is mounted on valve shaft 23 in a reverse manner to the disposition of sector 34, so that when the valve is closed and the plug 13 seated, flattened or deformed tooth 78 and lug 65 of the sector 35 abut the plain face 67 of the rack 48, and the teeth 68 of the sector 35 are not in mesh with the teeth of the rack 48.

As shown in Fig. 4, the series of teeth of rack 48 are substantially equal in length and number to the series of teeth of rack 47, however the teeth of rack 48 are offset or staggered with respect to the teeth of rack 47, so that when the bar 50 is moved in the direction of the arrow, Fig. 4, the teeth of rack 48 will not mesh with the teeth 68 of sector 35 until after the bar 50 has moved a predetermined amount. Due to the engagement of flattened or deformed tooth 78 and lug 65 with the plain surface 67 of rack 48, sector 35 will remain stationary during the initial movement of the bar 50 in the direction of the arrow, Fig. 4. As shown in Figs. 7, 11 and 15, sector 38 is formed with a comparatively short series of teeth 69 which are disposed intermediate two plain arcuate portions 70 and 71. The end tooth adjacent plain surface 70 is cut-off or flattened, as indicated at 79, and the end tooth adjacent plain surface 71 is also cut-off or flattened, as indicated at 80.

A lug 72 is formed at the outer end of plain section 70, and a similar lug 73 is formed at the outer end of plain section 71.

When the valve is closed and the plug 13 seated, cut-off or flattened tooth 79 and lug 72 are in engagement with a plain surface 74 on the rack 49, so that sector 38 is prevented from rotating during the initial movement of the rack bar 50.

When the valve is open and the plug 13 seated, cut-off or flattened tooth 80 and lug 73 are in engagement with plain surface 75 on the rack 49, thereby preventing rotation of the sector 38.

Sector 38 is keyed to the valve shaft, and consequently when the sector teeth 69 are in meshing relationship with the teeth of rack 49, the movement of the rack a predetermined amount rotates the sector 38 and the valve shaft fixed thereto through a predetermined angle, thereby turning the valve plug 13.

As shown in Fig. 4 the first tooth of rack 49 alines with the first tooth of rack 48, and since the first teeth 78 and 79 of the sectors 35 and 38, respectively, are correspondingly positioned, consequently when the bar 50 has moved a distance in the direction of the arrow Fig. 4 to engage sector teeth 68 with rack 48, the teeth 69 of sector 38 will also be engaged by the teeth of rack 49, so that both sectors 35 and 38 will rotate in unison. However, since there are fewer teeth formed on sector 38 and rack 49, than are formed on sector 35 and rack 48, the teeth of sector 38 will unmesh from the teeth of rack 49 prior to the unmeshing of the teeth of sector 35 with the teeth of rack 48. Therefore, sector 38 will not be turned through as great an angle as is sector 35.

Since sector 35 is connected to the sleeve 32 by sliding key 36, rotation of sector 35 by its rack 48 effects corresponding movement of the sleeve. Therefore, it will be noted that the purpose of sector 35 and its rack 48 is to rotate sleeve 32. When cut-off tooth 78 and lug 65 of sector 35 are in engagement with plain surface 67 of rack 48, sector 35 is locked in position, and consequently sleeve 32 is held stationary. Accordingly, during the initial movement of rack bar 50, due to the threaded engagement of sector 34 with the threads 33 of sleeve 32, the rotation of sector 34 about stationary sleeve 32 effects movement of the sleeve 32 longitudinally of the axis of shaft 23. However, since the sleeve 32 is prevented from moving longitudinally with respect to the valve shaft 23 by nut 42 and washer 45 at one end and washer 43 at the opposite end of said sleeve, obviously any longitudinal movement imparted to sleeve 32 by the sector 34, will cause a corresponding longitudinal or axial movement of valve shaft 23, and since plug 13 is fixed to shaft 23, the plug will also be moved longitudinally or axially in the valve body 11.

The construction and mode of operation of the parts is such that initial movement of the rack bar 50 causes the valve shaft 23 and plug 13 to move in the direction of the arrow, Fig. 3, whereby the plug 13 is unwedged. After the rack bar 50 has moved a predetermined amount and the plug 13 has thus been unwedged, the sectors 35 and 38 will be rotated by the racks 48 and 49 respectively, and this results in both the valve shaft 23 and sleeve 32 being also rotated together with the sector 34. Since sector 34 and sleeve 32 are now simultaneously being rotated, there will not be any relative movement of sleeve 32 with respect to the threaded hub of sector 34 and consequently the valve plug 13 will remain in its unwedged position during the period it is being rotated by sector 38.

When the valve plug 13 has been rotated through a predetermined angle, the teeth of sectors 34 and 38 unmesh from the rack teeth 47 and 49, respectively, so that continued movement of rack bar 50 is ineffective in causing further rotation of the valve plug 13, through sector 38 and valve shaft 23, and sector 34.

However, since the teeth 68 of sector 35 remain in meshing relationship with the rack teeth 48, sector 35 will continue to rotate after the rotation heretofore imparted to sectors 34 and 38 is halted. This continued rotation of sector 35 causes a corresponding rotation of sleeve 32, and due to the fact that sector 34 is now stationary, due to the engagement of cut-off tooth 77 and lug 64 with plain surface 63 of rack 47, sleeve 32 is unscrewed from the threaded hub of sector 34 and the valve shaft 23 is now moved longitudinally or axially in the direction opposite to the arrow (Fig. 3) and consequently, the plug 13 is reseated or rewedged in the valve housing 11.

From the foregoing, it will thus be noted, that assuming that the valve plug 13 is in closed position as shown in Fig. 1, when it is desired to open the valve, fluid under pressure supplied to piston chamber 55, with chamber 57 open to the exhaust or atmosphere, will effect movement of pistons 51 and 53 and rack bar 50 in the direction of the arrow, Fig. 2. This movement of the rack bar 50 from left to right, effects rotation of the sectors 34, 35 and 38 in a clockwise direction, with the result that the valve plug 13 is first unseated or unwedged, then rotated, and then seated or rewedged, as has been heretofore described, thereby opening the passage through the valve.

When it is desired to close the valve, fluid under pressure can be supplied to piston chamber 57, and piston chamber 55 connected to the exhaust or atmosphere. The force of the fluid in chamber 57 acting on piston 53 will move the pistons 51 and 53 and rack bar 50 towards the left, and this action effects rotation of the sectors 34, 35 and 38 in a counterclockwise direction from their respective positions shown in Figs. 13, 14 and 15, to the positions shown in Figs. 5, 6 and 7, thereby operating the parts in an opposite direction from that described above so that the plug is closed and reseated, as shown in Fig. 1.

In the embodiment of the invention herein shown and described, the construction and operation of the valve is such that the plug is first moved in a straight line axially a predetermined distance through the operation of rack 47 and sector 34, then the plug is turned through an angle of 90° through the operation of rack 49 and sector 38. During the turning of the plug both of the sectors 34 and 35 rotate in unison with sector 38 and consequently the plug remains in its unwedged position. At the completion of the turning movement of the plug, sector 34 remains stationary with sector 38, and sector 35 continues to rotate an amount so that the plug is moved in a straight line axially towards its seat a distance equal substantially to the distance the plug was first moved away from its seat.

It will be understood that modifications can be made in the construction of the valve without departing from the scope of the invention.

Having thus described my invention, what I claim is:

Valve shaft actuating means for a valve adapted to be moved in a straight line to unseat the valve and then rotated through a predetermined arc at the completion of the reciprocating movement to turn the valve from closed to open position and vice versa, comprising a shaft having a smooth external surface, a sleeve mounted on said shaft and having a smooth internal surface whereby the sleeve is free to turn independently of the shaft, means for preventing longitudinal movement of said sleeve with respect to said shaft, said sleeve having an externally screw threaded portion and a plain external portion, a gear sector having an internally threaded portion mounted on the threaded portion of said sleeve for moving said sleeve and said shaft axially when the gear is rotated, a second gear sector keyed to said sleeve for rotating the sleeve when said second gear sector is rotated, a third gear sector keyed to the shaft for turning the shaft when said third gear sector is rotated, each of said gear sectors having a toothed portion and a plain portion, a reciprocating bar adapted to be moved in a straight line and having three sets of teeth for intermeshing respectively with the teeth of said three gear sectors, the teeth being formed in said bar whereby the first set of teeth only are intermeshed with the teeth of the first gear sector when the bar is in one position, the second and third sets of teeth of said bar being adapted to intermesh simultaneously with the teeth of said second and said third gear sectors after the bar has moved a predetermined distance from the first position, and the first and third set of teeth of said bar being adapted to unmesh simultaneously from the teeth of said first and third gear sectors after the bar has moved a predetermined distance from the second position, and means for reciprocating said bar.

ROBERT BISCHOFF.